(12) United States Patent
Johnson et al.

(10) Patent No.: US 6,481,151 B1
(45) Date of Patent: Nov. 19, 2002

(54) MULTIPLE RODENT TRAP WITH SLIDING COVER

(75) Inventors: Daniel C. Johnson, Madison, WI (US); James R. Walsh, Wauwatosa, WI (US); Scott J. Collins, Brown Deer, WI (US)

(73) Assignee: Bell Laboratories, Inc., Madison, WI (US)

( * ) Notice: Subject to any disclaimer, the term of this patent is extended or adjusted under 35 U.S.C. 154(b) by 0 days.

(21) Appl. No.: 09/876,797

(22) Filed: Jun. 7, 2001

(51) Int. Cl.[7] .............................................. A01M 23/04
(52) U.S. Cl. .......................................................... 43/69
(58) Field of Search .............................. D22/119; 43/58, 43/61, 66, 69–74, 111

(56) References Cited

U.S. PATENT DOCUMENTS

| | | |
|---|---|---|
| 622,057 A | 3/1899 | Mathias |
| 697,233 A | 4/1902 | Chagnot |
| 942,069 A | 12/1909 | Hess |
| 1,016,405 A | 2/1912 | Ferguson |
| 1,024,782 A | 4/1912 | Jackson |
| 1,323,399 A | 12/1919 | Lokai |
| 1,340,801 A | 5/1920 | Shields |
| 1,407,861 A | 2/1922 | Hiett |
| 1,500,050 A | 7/1924 | Bunn |
| 1,541,639 A | 6/1925 | Gregory |
| 1,750,075 A | 3/1930 | Waterman |
| 1,798,717 A | 3/1931 | Baranski |
| 2,163,577 A | 6/1939 | Allen |
| 2,437,248 A | 3/1948 | Fleig |
| 2,741,866 A | 4/1956 | Shirley |
| 4,048,745 A | 9/1977 | Morford |
| 4,103,448 A * | 8/1978 | Souza ........................... 43/67 |
| 4,748,766 A | 6/1988 | Stimac |
| 4,876,821 A | 10/1989 | Benzie |
| 4,887,381 A * | 12/1989 | Tieben .......................... 43/66 |
| 4,937,968 A | 7/1990 | Thomas |
| 5,299,380 A | 4/1994 | Fornal, Sr. |
| 5,471,781 A | 12/1995 | Vine |

OTHER PUBLICATIONS

Victor "Mice" Trap photographs.
Victor Tin Cat photographs.
"Thirty Mice, No Winding" Aug. 1995 Pest Control, p. 83.

* cited by examiner

Primary Examiner—Charles T. Jordan
Assistant Examiner—Bret Hayes
(74) Attorney, Agent, or Firm—Lathrop & Clark LLP

(57) ABSTRACT

A molded plastic base has a rodent runway which extends from two inlet openings to a single rodent containment compartment. Pivotable ramps are positioned in the rodent runway adjacent cacti inlet opening. A plastic lid is slidingly engaged with the base, and is movable along the axis of the rodent runway. The lid has downwardly extending tabs which have inclined inside and outside surfaces, and barriers extending between each pair of tabs. The inclined surfaces of the tabs engage inclined protrusions which project upwardly from the ramps when the lid is slid open and closed, the engagement between the inclined surfaces causes the ramps to pivot out of the way of the barriers, facilitating smooth and uninterrupted opening and closing of the lid on the base.

3 Claims, 2 Drawing Sheets

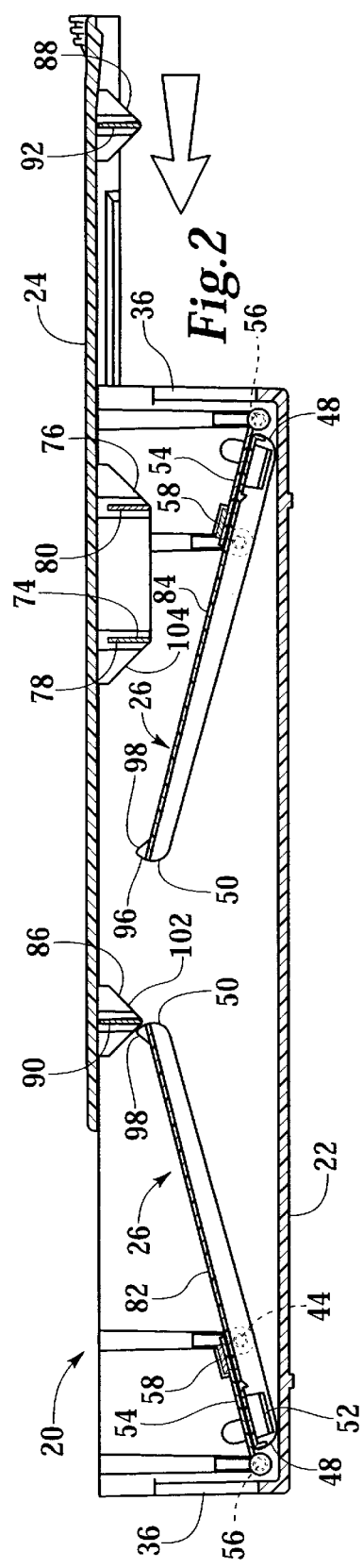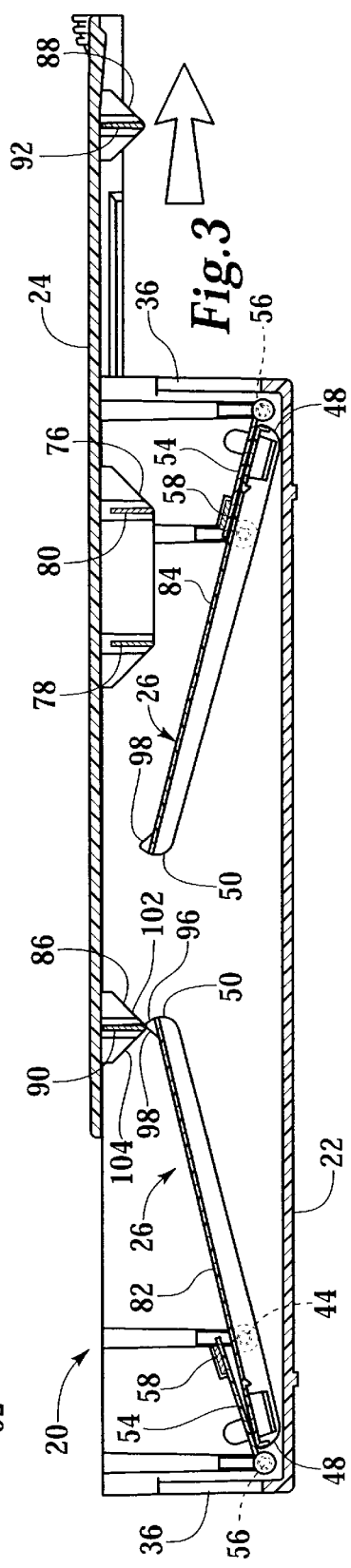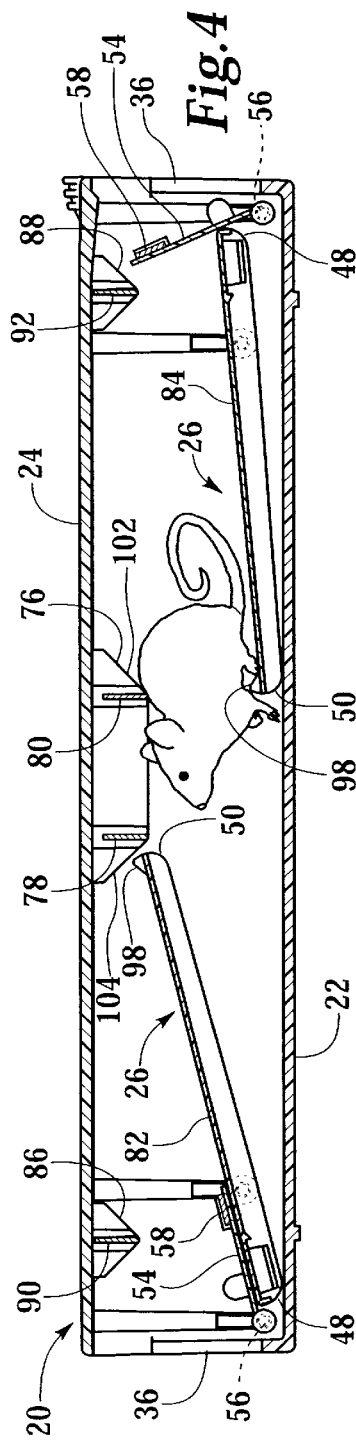

MULTIPLE RODENT TRAP WITH SLIDING COVER

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable,

BACKGROUND OF THE INVENTION

The invention relates to rodent traps in general and to mousetraps which can sequentially capture alive a plurality of mice in particular.

Problems with rodents are at least as old as the discovery of agriculture. Rodents carry disease, consume and spoil grain and foodstuffs, and can damage buildings and their content. Various poisons are known to be effective in controlling pests, particularly rats and mice, however in many situations it is desirable to be sure that the rodents do not die in inaccessible portions of the building or dwelling, where decomposition can cause other unwanted problems.

Typically rodent poisons cause the animals to leave the building or dwelling in search of water, but in those situations where water is available within the building it is particularly desirable to use rodent control systems which capture rather than poison the undesirable vermin. Capturing the rodents allows the type and number of rodents present in the building or dwelling to be monitored, and so a number of traps may be used even in a situation where a majority of pest control is accomplished with poisoned halt.

Capturing vermin alive has advantages both in the simplicity of the trap and in avoiding the resultant mess which may result from the destruction of rodents daring their capture. Live capture is also desired by those who do not wish to kill but only remove undesirable vermin from their premises or dwelling. The basic design for live traps for various types of vermin is that of a box with a folding lid which can be accessed through a one-way door or mechanism that allows mice to enter the box but not to leave. One of the simplest and most reliable mechanisms for creating a one-way door, employs s centrally pivoted lever. A narrow tunnel is provided along one side of the box which forms the trap. As rodents are known to move along the walls of a room, and to be attracted to small opening or tunnels, the mice enter the tunnel formed along the side of the box and pass over the pivoting lever, crossing the axis and being discharged into an internal compartment.

After the mouse crosses the lever into the central volume of the box, the lever returns to its original position. A pivoting barrier is mounted to overlie the lever, such that any attempt by a rodent to remount the lever causes the pivoting barrier to be raised, blocking exit from the trap. Usually, a barrier is fixed above the pivoting barrier, to prevent the rodent from being able to get a grip on the pivoting barrier.

A typical rodent trap of the type designed to catch live mice may be able to trap as many as 30 mice which are held within the interior of the trap box. If the box is of the conventional type, opening the pivoting lid to dispose of the mice exposes the person who opens the box to a large number of rodents which may leave the box in a disorganized power. Plastic traps which have a sliding lid are known, but such a trap has only a single entrance to the trap. What is needed is a trap for catching a number of mice which has multiple entrances and which incorporates a lid or opening mechanism for the release of the mice which facilitates controlled release of the contents spaced from the operator who is opening the trap.

SUMMARY OF THE INVENTION

The rodent trap of this invention has a plastic base with a rodent runway which extends from two inlet openings to a single rodent containment compartment. Pivotable ramps are positioned in the rodent runway adjacent each inlet opening. A plastic lid is slidingly engaged with the base, and is movable along the axis of the rodent runway. The lid has downwardly extending tabs which have inclined inside and outside surfaces, and barriers extending between each pair of tabs. The inclined surfaces of the tabs engage inclined protrusions which project upwardly from the ramps when the lid is slid open and closed, the engagement between the inclined surfaces causes the ramps to pivot out of the way of the barriers, facilitating smooth and uninterrupted opening and closing of the lid on the base.

It is an object of the present invention to provide a rodent trap having multiple inlet openings and a lid which is slidable with respect to a base.

It is another object of the present invention to provide a rodent trap with a lid having barriers thereon which is easily removed without interference with pivotable ramps:

Further objects, features and advantages of the invention will be apparent from the following detailed description when taken in conjunction with the accompanying drawings.

BRIEF DESCRIPTION OF THE DRAWINGS

FIG. 2 is a cross-sectional view of the trap of FIG. 1 taken through the rodent runway, showing the lid being removed.

FIG. 3 is a cross-sectional view of the trap of FIG. 2, showing the lid being closed on the base.

FIG. 4 is a cross-sectional view of the trap of FIG. 3, showing the lid fully closed on the base, with a mouse entering.

DESCRIPTION OF THE PREFERRED EMBODIMENTS

Figure 1:
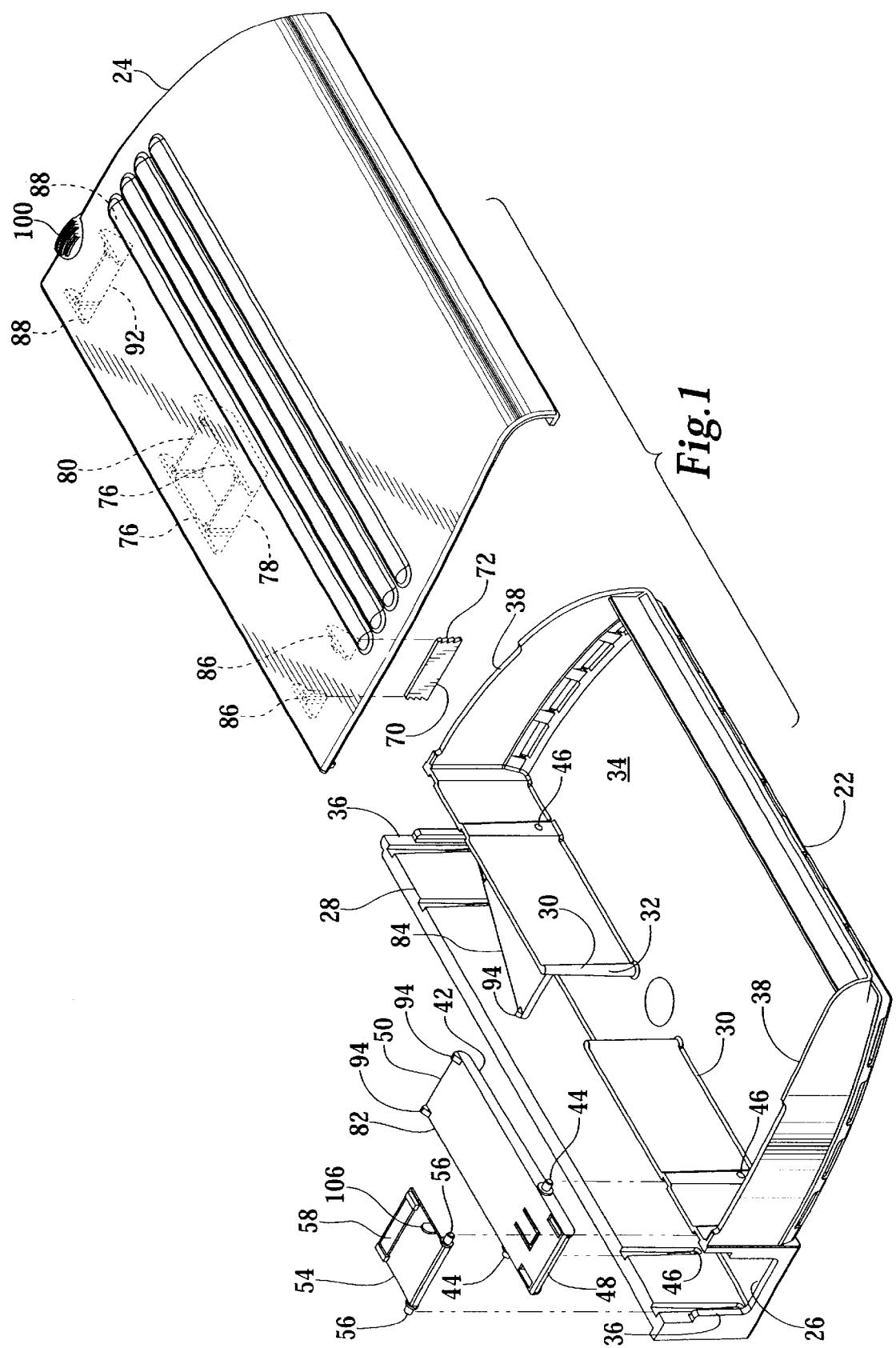
FIG. 1 is an exploded isometric view of the multi-catch rodent trap of this invention.

Referring more particularly to FIGS. 1–4, wherein like numbers refer to similar parts, a rodent trap 20 is shown. The trap 20 has an injection molded base 22 having an injection molded plastic lid 24 which is slidingly engaged with the base. The lid 24 may be transparent or translucent to permit inspection of the trap contents. The base 22 has a rodent runway 26 defined between a rear exterior wall 28 and two interior walls 30. A gap 32 between the two interior walls 30 provides access from the rodent runway 26 to an interior rodent compartment 34. Rodent inlet openings 36 are diffused in two opposed side walls 38 of the base 22. The trap 20 is provided with structure mounted to the base 22 and the lid 24 which permits the ready enhance of rodents into the rodent compartment 34 and which restricts their escape. The lid preferably can be withdrawn only in a single direction, and is slidable in the direction of the axis defined by the rodent runway. The lid has a rear flange and a front flange which engage with parallel portions of the base to constrain the lid 24 to move axially.

As shown in FIG. 1, a molded plastic entrance ramp is pivotably mounted to the base in the runway 26 adjacent cacti inlet opening 36. The entrance ramps comprise a first entrance ramp 82, and a second entrance ramp 84. The like entrance ramps will be discussed with respect to a single ramp below, with reference numerals for both entrance ramps. The entrance ramp 82, 84 has parallel side members 42 from which pivot pins 44 extend. The pivot pins 44 are received within mounting holes 46 formed in the exterior wall 28 and one of the interior walls 30. The pivot pins are positioned more closely to the outward end 48 of the ramp 82, 84 than to the inward end 50. A counterweight 52, shows in FIG. 2, is mounted near the outward end 48 of the ramp 82, 84 which saves to retain the inward end 50 of the ramp elevated when no weight is placed on the ramp at a position inward of the pivot pins 44.

A molded plastic pivot barrier 54, as shown in FIG. 1, is shorts than the ramp 82, 84, and is also mounted by sidewardly extending pivot pins 56 to holes molded into the rear exterior wall 28 and one of the interior walls 30. The pivot barrier 50 extends from the inlet opening 36 to about the position of the pivot axis of the ramp 82, 84. A metal strip 58 which struts as a chew guard is mounted to the pivot barrier 54, which saves to bias the pivot barrier to lit adjacent to the ramp 82, 84.

As a rodent approaches the trap 20, the pivot barrier 54 and the ramp 82, 84 appear to form a nearly continuous pathway along the runway 26. As the rodent enters the runway 26 and treads upon the pivot barrier 54, ate pivot barrier 54 is pressed down upon the ramp 82, 84. As shown in FIG. 4, as the rodent moves past the ramp pivot axis defined between the opposed pivot pins 44, the ramp will begin to pivot downward. Proceeding along the ramp 82, 84, the weight of the rodent will overcome the counterweight on the ramp 82, 84, and the rodent will then pass over the ramp 82, 84 and be discharged from the ramp at a position adjacent the gap 32 between the interior walls 30, providing entrance to the interior compartment 34. Once the rodent has stepped off the ramp 82, 84, the ramp inward end 50 will return to an elevated position The rodent is now trapped within the trap 20.

To prevent escape of the rodent from the trap 20, structure is provided adjacent each of the two ramps 82, 84 which restricts the access of the rodent from the inside to the inward end 50 of the ramp and to the inlet opening 36. As shown in FIG. 1, four metal barriers are affixed to the plastic lid 24 to extend downwardly into the runway. 26. Each barrier is a metal strip 70, similar to the strips 58, having downwardly angled serrations or teeth 72 on the sides which allow the metal strip to be securely assembled within downwardly opening slots 74 formed in plastic tabs which extend downwardly from the lid 24.

As shown in FIG. 1, two central tabs 76 are parallel to one another and are positional alongside the exterior wall 28 and the two interior walls 30. The central tabs 76 extend between the inward ends 50 of the ramps 82, 84. Two parallel metal strips 70 extend between the two central labs 76 and define, when the lid 24 is in a closed configuration, a first inner barrier 78, and a second inner barrier 80. The first inner barrier 78 extends downwardly below the level of the inward end 50 of the first ramp 81, while the second inner barrier docs the same with respect to the second ramp 84. These downwardly extending barriers 78, 80 block access by the rodent to the inward ends 50 of the ramps 82, 84. Nevertheless, in the event that a rodent is able to engage the inward end of a ramp, and pivot it downwardly to climb thereon, outer barriers provided.

A pair of first outer tabs 86 are provided extending downwardly from the lid 24 at a position spaced above the outward end 48 of the first ramp 82, and a similar pair of second outer tabs 88 extends downwardly from the lid at a position spaced above the outward end 48 of the second ramp 84. A single metal strip 70 is fastened between each pair of outer tabs to define a first outer barrier 90 and a second outer barrier 92. If a rodent is able to move back onto the ramp 82, 84, the downward pivoting of the inward end of the ramp will cause the pivot barrier 54 to rotate outwardly and block the lower part of the inlet opening 36. The downwardly extending outer barrier blocks the upper part of the inlet opening 36 and prevents escape of the rodent. To prevent the pivot barriers front being pivoted outwardly too much, a limit protrusion 106 extends upwardly from each pivot barrier 54. The limit protrusion 106 will engage against portions of the side wall 38 surrounding the inlet opening 36 and will set a limit to the amount of outward pivoting which the pivot barrier 54 can perform.

The rodent trap 20 will typically be placed along a building wall with the indent runway 26 positioned adjacent the wall. By providing rodent inlet openings 36 onto bath ends of the runway 26 mice approaching the trap from either side may enter.

Over a period of time the rodent trap 20 may capture a number of rodents. When the user services the trap, it will typically be lifted from its service position and taken to a place of rodent disposal. Because one or more of the captured rodents may still be alive, it is helpful for the user to retain control over the discharge of indents from the interior compartment 34. The rear hinge of conventional multiple catch traps has a disadvantage that in order to discharge a single rodent, the trap must be nearly fully uncovered. The present trap 20, on the outer hand, has a sliding lid which can be advanced toward the second ramp 84 incrementally to produce an opening between the lid and the base large enough only for one rodent to be discharged at a time. Hence, the successful operation of the trap 10 will involve repeated opening and closing of the sliding lid on the base 22. It will be noted, however, that the barriers 78, 80, 90, 92 extend down below the uppermost level of the ramps 82, 84. To provide for smooth unimpeded opening and closing of the lid 24 on the base 22, cam structure is provided on the barrier tabs and the ramps 82, 84.

As shown in FIG. 1 , each ramp 82, 84 has two triangular protrusions 94 which project upwardly from the inward end 50. The protrusions 94 have an inwardly facing inclined surface 96 and an outwardly facing inclined surface 98. The protrusions extend an opposite sides of the ramp 82, 84 and are positioned in line with the tabs 76, 86, 88. As shown in FIGS. 2–3, each of the plastic tabs 76, 86, 88 has an inclined opening surface 102 which faces a finger grip 100 molded into the lid, and an inclined closing surface 104 facing the apposite direction.

The inclined opening and closing surfaces 102,104 of the barrier tabs 76, 86, 88, and the inclined inwardly and outwardly facing surfaces 96, 98 of the ramp protrusions 94 cooperate to pivot the ramps 82, 84 out of the way of the barriers as the lid is opened and closed on the base 22.

As shown in FIG. 3, as the lid 24 is slid off of the base 22, first the opening surfaces 102 of the central tabs 76 engage the inwardly facing inclined surfaces 96 of the protrusions 94 of the second ramp 84. Further advancement of the lid 24 causes the barrier tabs to depress the ramp protrusions 94 and cause the second ramp 84 to pivot and clear the metal first inner barrier 78 and second inner barrier 80. Next, the first outer tabs 86 will in a like manner encounter the outwardly facing inclined surfaces 98 of the first ramp 82, also causing the first ramp to pivot and provide clearance between the first ramp and the first outer barrier 90. As the lid is retracted further, the inwardly facing inclined surfaces 96 of the first outer tabs 86 engage against the inwardly facing inclined surfaces 96 of the protrusions 94 of the second ramp 84, causing the second ramp to also pivot downwardly providing clearance for the first outer barrier 90.

As shown in FIG. 2, when the lid 24 is slid back onto the base 22, the opposite surfaces of the tabs will engage the opposite surfaces of the ramp protrusions 94, but will serve the same purpose of pivoting the ramps out of the way temporarily as the barriers pass overhead. The cam action of the protrusions 94 and the inclined surfaces of the tabs permits smooth operation of the sliding of the lid with respect to the base 22. This advantageously permits speedy emptying of the contents of the trap 20.

It is understood that the invention is not limited to the particular construction and arrangement of parts herein illustrated and described, but embraces all such modified forms thereof as come within the scope of the following claims.

We claim:

1. A rodent trap comprising:

a base having an upwardly extending rear wall, and at least one interior wall spaced from the near wall to define a rodent runway, the rodent runway extending from a first trap inlet to a second trap inlet, and communicating with an interior compartment;

a lid slidably mounted to the base, the lid being mounted to cover the rodent runway and to be slidable from a closed position in which the runway is fully covered, to an open position;

a first entrance ramp, pivotably mounted to the base within the runway between the first inlet and the interior compartment, the first ramp having an inward end;

a first inclined protrusion projecting upwardly from the inward end of the first entrance ramp;

a first barrier extending downwardly from the lid and positioned to extend in close proximity to the inward end of the first entrance ramp when the lid is in the closed position; and a first tab positioned adjacent the first barrier, the first tab having an inclined portion which faces the first inclined protrusion, such that when the lid is slid with respect to the base the first tab inclined portion engages the first ramp inclined protrusion to cause the first ramp to pivot and provide clearance for the first barrier to pass over the first ramp.

2. The rodent trap of claim 1 further comprising a second entrance ramp, pivotably mounted to the base within the runway between the second inlet and the interior compartment, the second ramp having an inward end; and a second inclined protrusion projecting upwardly from the inward end of the second entrance ramp, wherein the first tab inclined portion is positioned to sequentially engage the first ramp inclined protrusion and the second ramp inclined protrusion in the course of slidably moving the lid off the base.

3. A rodent trap comprising:

a base having walls which define an axially extending rodent runway, the runway extending between a first rodent inlet and a second rodent inlet and communicating with an interior compartment;

a lid slidably mounted to the base, the lid being mounted to cover the rodent runway and to be axially slidably from a closed position in which the runway is covered, to an open position;

a first ramp, pivotably mounted to the base within the runway between the first inlet and the interior compartment, the first ramp having an inward end;

a second ramp, pivotably mounted to the base within the runway between the second inlet and the interior compartment;

a first barrier, extending downwardly from the lid and positioned to extend in close proximity to the inward end of the first ramp when the lid is in the closed position; and a first tab positioned adjacent the first barrier, the first cab having portions which extend downwardly to engage the first ramp when the lid is slid axially with respect to the base, such that when the first barrier passes oven the first ramp inward end, the first tab protrusion causes the first ramp to pivot to avoid restricting the sliding movement of the lid by interference between the first barrier and the first ramp.

\* \* \* \* \*

UNITED STATES PATENT AND TRADEMARK OFFICE
CERTIFICATE OF CORRECTION

PATENT NO. : 6,481,151 B1
DATED : November 19, 2002
INVENTOR(S) : Johnson et al.

It is certified that error appears in the above-identified patent and that said Letters Patent is hereby corrected as shown below:

<u>Title page,</u>
Item [57], ABSTRACT,
Line 4, "cacti" should be -- each --

<u>Column 1,</u>
Line 35, "halt" should be -- bait --
Line 38, "daring" should be -- during --
Line 46, "employs s" should be -- employs a --
Line 67, "power" should be -- manner --

<u>Column 2,</u>
Line 28, "ramps:" should be -- ramps. --
Line 59, "enhance" should be -- entrance --

<u>Column 3,</u>
Line 1, "cacti" should be -- each --
Line 10, "shows" should be -- shown --
Line 12, "saves" should be -- serves --
Line 16, "shorts" should be -- shorter --
Line 19, "barrier 50" should be -- barrier 54 --
Line 21, "struts" should be -- serves --
Line 22, "saves" should be -- serves --
Line 27, "ate" should be -- the --
Line 38, "position The" should be -- position. The --
Line 45, "runway.26" should be -- runway 26. --
Line 52, "positional" should be -- positioned --
Line 59, "ramp 81," should be -- ramp 82, --
Line 60, "docs" should be -- does --

<u>Column 4,</u>
Line 28, "indents" should be -- rodents --
Line 36, "trap 10" should be -- trap 20 --
Line 52 "aposite" should be -- opposite --

<u>Column 5,</u>
Line 26, "near" should be -- rear --

UNITED STATES PATENT AND TRADEMARK OFFICE
CERTIFICATE OF CORRECTION

PATENT NO. : 6,481,151 B1
DATED : November 19, 2002
INVENTOR(S) : Johnson et al.

It is certified that error appears in the above-identified patent and that said Letters Patent is hereby corrected as shown below:

Column 6,
Line 24, "slidably" should be -- slidable --
Line 33, "barrier," should be -- barrier --
Line 37, "cab" should be -- tab --
Line 40, "oven" should be -- over --

Signed and Sealed this

Eleventh Day of March, 2003

JAMES E. ROGAN
*Director of the United States Patent and Trademark Office*